United States Patent [19]

Brendel et al.

[11] 4,059,005
[45] Nov. 22, 1977

[54] ROTARY TRANSFORMER SHUNT CALIBRATION

[75] Inventors: Albert E. Brendel, Lake Orion; Myron P. Sedman, Troy, both of Mich.

[73] Assignee: Lebow Associates, Inc., Troy, Mich.

[21] Appl. No.: 699,553

[22] Filed: June 24, 1976

[51] Int. Cl.² .............................................. G01L 25/00
[52] U.S. Cl. ................................. 73/1 B; 73/136 A
[58] Field of Search ............ 73/1 R, 1 B, 1 C, 136 A

[56] References Cited

U.S. PATENT DOCUMENTS

| | | | |
|---|---|---|---|
| 3,134,279 | 5/1964 | Sims et al. | 73/1 C |
| 3,319,155 | 5/1967 | Kooiman | 73/1 R |
| 3,817,089 | 6/1974 | Eggleton et al. | 335/206 |

*Primary Examiner*—S. Clement Swisher

[57] ABSTRACT

A rotary transformer transducer system includes a rotatable shaft having a rotor and a transducer each mounted thereon, and a stationary member including a stator, with the rotor and stator coupling electrical energy therebetween without physical contact. A selectable resistor is mounted on the rotatable shaft for direct shunt calibration of the transducer without physical contact with the stationary member. A magnetically actuated reed switch is mounted on the shaft for coupling the resistor to the transducer, and an electromagnet is mounted on the stationary member for operating the switch.

7 Claims, 6 Drawing Figures

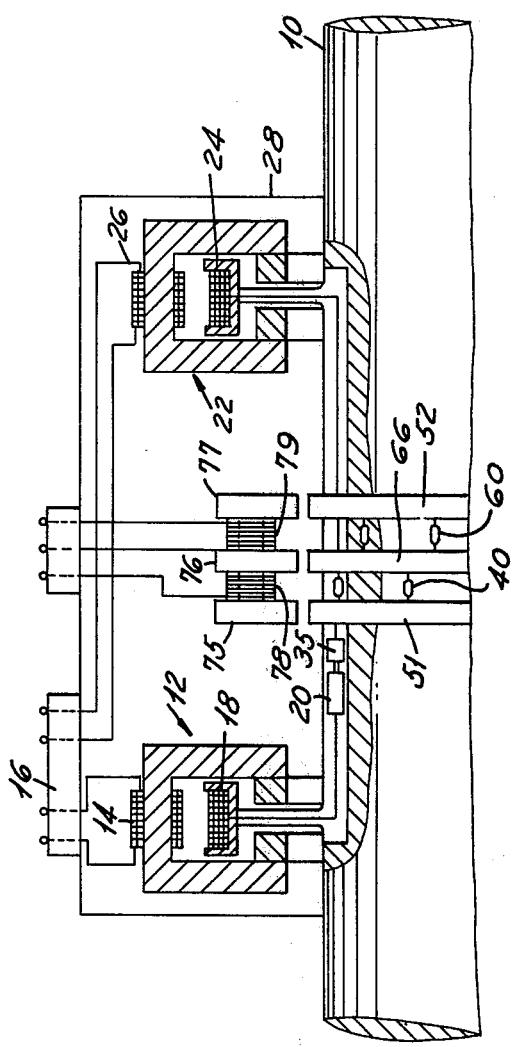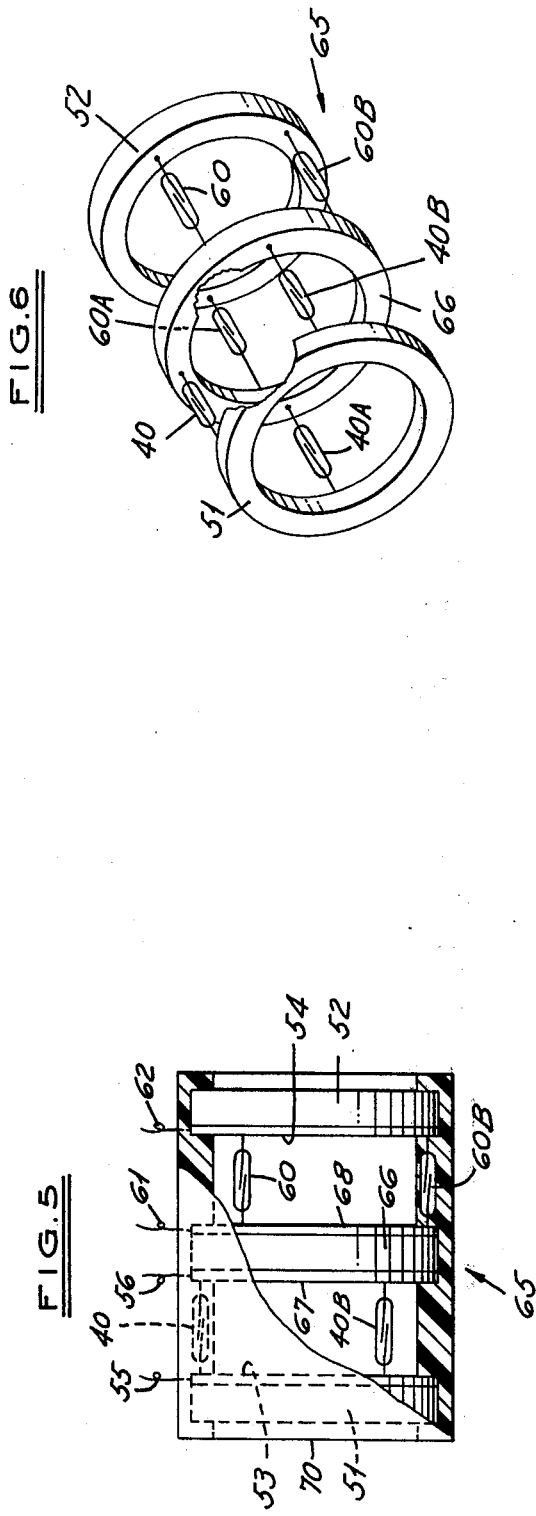

ROTARY TRANSFORMER SHUNT CALIBRATION

BACKGROUND OF THE INVENTION

This invention relates generally to rotary transformer systems and, more particularly, to an improved shunt calibration system for a rotary transformer transducer system.

Rotating shaft torque transducers often utilize the maintenance advantages of rotary transformers for signal transfer. Rotating transformers differ from conventional transformers only in that either the primary or secondary winding is rotating. Such rotary transformers are generally described in U.S. Pat. No. 3,611,230 entitled Rotary Transformer Structure. One transformer is used only to transmit the AC bridge supply voltage to the strain gage bridge, and a second transformer is used to pick off the output voltage. Thus, there is no direct contact between the rotating and stationary elements of the sensor. Due to this isolation, an external or dummy bridge or a Ground Reference Network, as disclosed in U.S. Pat. No. 3,790,811 must be used on the instrument side of the transformers to provide a current return path for the AC carrier instruments used.

When a rotary transformer system is utilized in conjunction with a strain gage bridge transducer to measure the torque on the shaft, it is desirable to calibrate the strain gage bridge relative to the electrical instrumentation. Such calibration is necessary because of normal variations in the electrical equipment which provides the multiple functions of supplying the signal to the strain gage bridge and which receives the output signal from the strain gage bridge. In addition, it is sometimes desirable to calibrate the equipment while the shaft is rotating.

To calibrate a strain gage bridge in general, a well known technique is to apply a resistor across one leg of the bridge. This technique is called shunt calibration because the resistor is connected in shunt or parallel across the bridge.

Prior to the present invention, calibration of the transducer in a rotary transformer system was very complex. The dummy bridge permitted a convenient method of performing a shunt calibration that is otherwise not possible on the shaft. This method of shunt calibration which is external to or removed from the rotating transducer is, in general, valid; however, it has certain limitations which restrict its use to controlled conditions which are difficult to obtain in actual practice.

Input impedance unbalance, found in some instruments, necessitates the use of a resistor-capacitor correction network with the dummy bridge. With an external shunt calibration system, the simulated shunt phase and the actual signal phase are frequency dependent and usually will not match. The shunt signal must be shifted to be in phase with the actual signal at the carrier drive frequency. This is accomplished by adjusting the values of the R-C network. The frequency sensitivity of this system limits instrument to instrument compatibility.

Hence, it is the object of this invention to eliminate the problem of instrument sensitivity by presenting the shunt calibration directly on the rotating strain gage bridge. The solution was to provide a means of switching-in an appropriate shunt resistor without physical contact between the static and rotating members and thus maintaining the advantages of a rotary transformer signal transfer system.

The system described herein makes use of a magnetically actuated switch, mounted on the rotating shaft, that is activated by introducing a magnetic field of sufficient strength. The switch, which is placed in series with a calibration resistor parallel to an appropriate leg of the bridge, can be activated and used in static and dynamic conditions regardless of shaft position by utilizing magnetically conductive rings.

BRIEF DESCRIPTION OF THE DRAWINGS

The various objects and advantages of the present invention will become more apparent upon reading the following detailed description of the invention taken in conjunction with the drawings. In the drawings, wherein like reference numerals identify corresponding components:

FIG. 4 is an illustration, partly in section, of a rotary transformer transducer system including the shunt calibration system of the present invention;

FIG. 5 is a front elevation of a modification of the magnetic switch and ring assembly of the present invention; and FIG. 6 is a partial perspective illustration of FIG. 5.

DETAILED DESCRIPTION OF THE INVENTION

Figure 1:
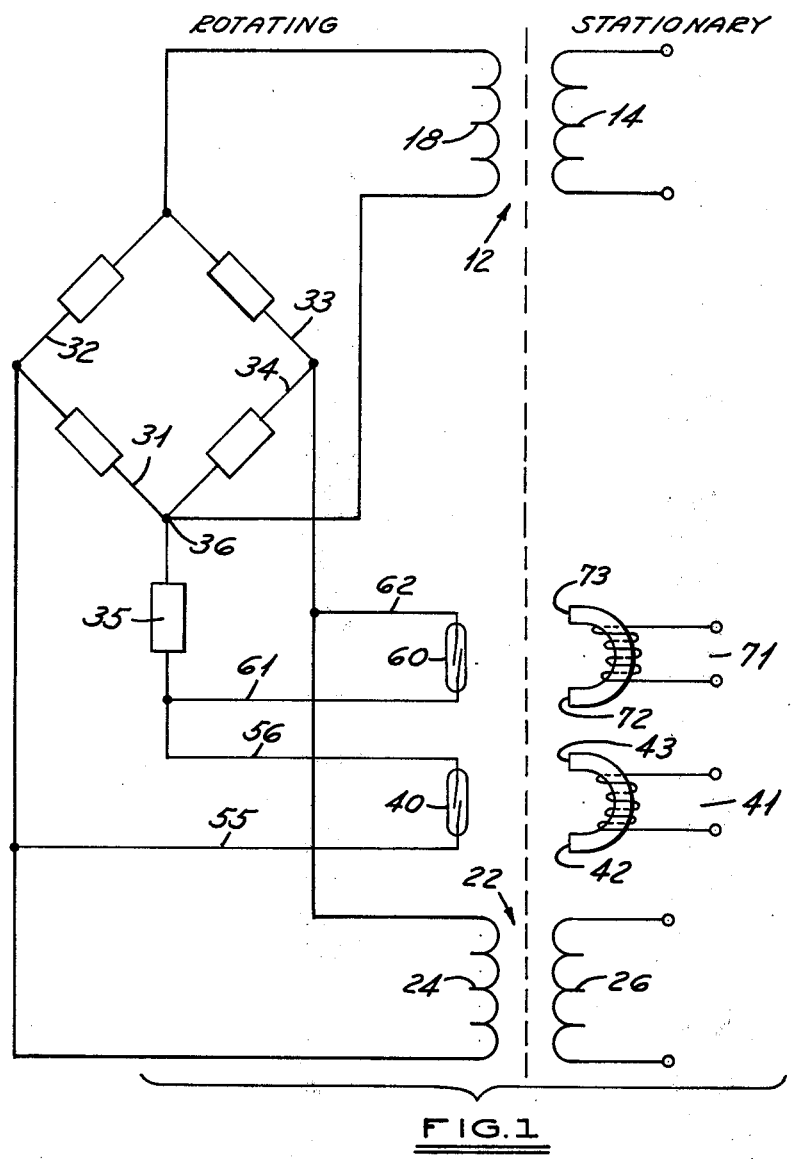
FIG. 1 is an electrical representation of the present invention in a rotary transformer system illustrating both the electrical coupling and the mechanical isolation of the system.

For a full understanding of the present invention, reference will be made to an environment in which the invention has a particular utility. That environment is a rotary transformer transducer system. It must be appreciated that once the broad principles of the present invention are understood, the invention may be utilized in other environments.

A rotary transformer transducer system is illustrated in FIG. 4 for measuring the torque of a rotatable shaft 10. The input signal is coupled to the shaft by a transformer 12 having a stationary winding 14 which enters a connecting block 16, and a rotatable winding 18 connected to a strain gage bridge transducer 20. The output is taken from the bridge by a second transformer 22 having a rotatable winding 24 coupled to the transducer and a stationary winding 26 which is also coupled to the connector block 16.

Transformers 12 and 22 are of the rotary type such as those manufactured by Lebow Associates, Inc., of Troy, Michigan, and generally disclosed in the aforementioned U.S. Pat. No. 3,611,230. Both rotary transformers are mounted within a stationary housing 28.

The electrical representation of this system is illustrated in FIG. 1 with the components on the left of the dash line being mounted on the rotating shaft 10 and the components to the right of the dash line being mounted in the stationary housing 28. Specifically, stationary windings 14 and 26, referring to the input and output signals, respectively, are secured within the housing 28 on the stationary side, while rotating windings 18 and 24 and the strain gage bridge transducer 20, are all mounted on and rotate with the shaft 10. The strain gage bridge 20 includes four legs, 31, 32, 33 and 34.

A shunt impedance 35, preferably a resistor, is selectively connectable across a first part of the strain gage bridge such as across leg 31 from a first terminal 36, defined as the junction of legs 31 and 34, through a magnetically responsive switch, such as a reed switch 40, and then to the common connection between legs 31 and 32 of the bridge. Upon closing switch 40 the impedance 35 is connected across leg 31. In order to actuate reed switch 40, an electromagnet 41 is provided having pole faces 42 and 43. Energization of magnet 41 closes switch 40 to couple the impedance 35 across leg 31; de-energization of the magnet permits the reed switch contacts to open. Thus, reed switch 40 is a normally open type of hermetically sealed reed switch.

If a single reed switch 40 is secured to the rotatable shaft 10, when the reed switch is 180° away from the pole faces of the electromagnet, a stronger magnetic flux density is required to close the contacts of the reed switch than when switch 40 is adjacent the pole faces. Thus, the switch is position-sensitive, i.e., its distance away from the magnets may cause it to be free of influence from the magnetic field.

Figure 2:
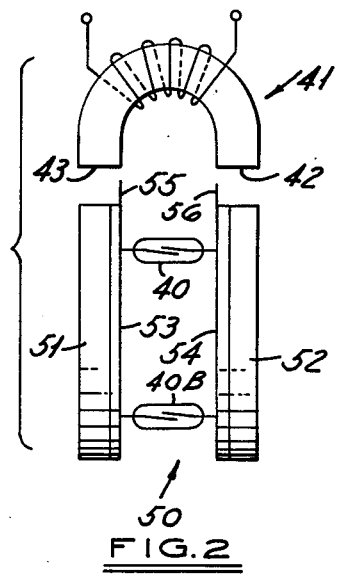
FIG. 2 is a front elevation of a first embodiment of the magnetic switches and ring assembly of the present invention.
Figure 3:
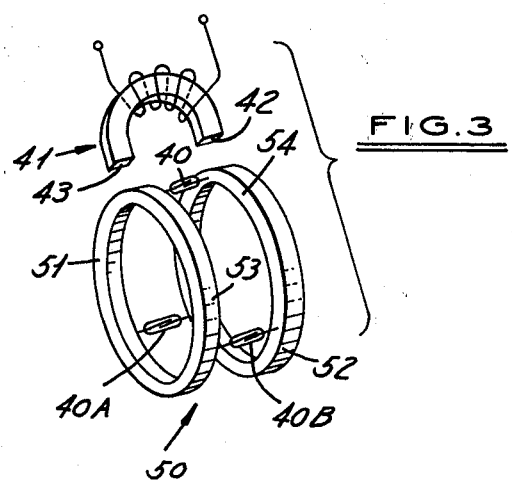
FIG. 3 is a perspective illustration of FIG. 2.

To eliminate position sensitivity and to minimize the effect of other variables such as shaft speed, shaft diameter, reed switch characteristics and magnet configuration, the preferred embodiment contemplates three reed switches 40, 40A, 40B, as illustrated in FIGS. 2 and 3 which are electrically connected in parallel and supported by a ring assembly 50.

The ring assembly 50 includes two spaced apart identical rings 51,52 of magnetically permeable steel. A ring 53,54 of phenolic resin material, e.g., "circuit board" which includes a copper facing, is bonded such as by epoxy to the opposed interior face of each ring, respectively. Each reed switch 40, 40A, 40B is soldered to each copper facing so that the switches are electrically wired together in parallel. The pole faces 42,43 of the magnet are positioned to oppose the steel rings 51,52. Thus, upon energization of the magnet 41, the steel rings concentrate the magnetic flux to assure that at least one reed switch closes. The leads 55,56 from the copper facings correspond to the leads 55,56 in FIG. 1.

It is preferred that the ring assembly, including the reed switches, be encapsulated in a sleeve of an insulating material such as epoxy. This sleeve containing the ring assembly is then placed on the shaft 10 with the steel rings 51,52 positioned under the poles 42,43 of the magnet.

Another variation of the present inventive concept for eliminating position sensitivity includes an electromagnet in the form of a complete annulus or toroid rather than the limited segment of FIGS. 2 and 3. In such an arrangement, since the magnetic flux encircles the shaft, only a single reed switch is required and the steel rings may be eliminated.

The foregoing provides single shunt calibration i.e., positive or negative. However, if both positive and negative shunt calibration are desired, then the structure of FIGS. 2 and 3 should be modified. Specifically, with regard to the electrical representation of FIG. 1, with the first reed switch coupling the resistor 35 across leg 31 of the bridge, a second normally open reed switch 60 is mounted on shaft 10 to couple the resistor across leg 34. This second reed switch is coupled by leads 61,62, respectively, to one side of the resistor and to the junction of bridge legs 33 and 34.

The ring assembly of FIG. 2 must be modified to the ring assembly 65 of FIG. 5 including the two exterior steel rings 51,52 and an intermediate ring 66, also made of magnetically permeable steel coated on both sides with the phenolic resin facings 67,68, respectively.

Again, to eliminate position sensitivity, three equally spaced apart parallel connected switches 60, 60A, 60B are soldered to facings 54 and 68 of rings 66 and 52 and the original switches 40, 40A, 40B are soldered to the facings 53 and 67 on rings 51 and 66. Leads 55 and 56 emanate from facings 53 and 67 while leads 61 and 62 emanate from facings 68 and 54.

It is again preferred to encapsulate the ring assembly 65 and all the reed switches in an epoxy sleeve 70 and then place sleeve 70 on shaft 10. Sleeve 70 has been omitted from FIGS. 4 and 6 for clarity of illustration.

To actuate the second series of reed switches, a second electromagnet 71 having pole faces 72,73 is provided as in FIG. 1.

In a preferred embodiment utilizing both positive and negative shunt calibration, the electromagnet may be of the type illustrated generally in FIG. 4 having three pole faces 75,76 and 77, and having two windings 78 and 79. Intermediate pole face 76 is, of course, common to both sets of windings 78 and 79. Each pole face is positioned across from a ring 51, 66, 52, respectively. A three-wire system, i.e., with one common wire, is used to energize one winding 78 or 79 to actuate the desired series of reed switches.

The foregoing is a description of the preferred embodiment of the present invention for mechanically isolating a shunt calibration impedance by placing the impedance on the rotatable member of a rotary transformer transducer system and by providing electromagnets on a stationary portion of such a system. Various modifications may be made without departing from the spirit and scope of the present invention. The invention, therefore, should be limited only by the scope of the following Claims.

We claim:

1. In a rotary transformer transducer system or the like including a rotatable shaft having a transducer and a rotor member each secured thereto for rotation therewith and a stationary member including a stator member, said rotor member and said stator member for coupling electrical energy therebetween without physical contact, the improvement of a selectively operable shunt calibration system comprising:
impedance means secured to said rotatable shaft for rotation therewith;
magnetically actuated switch means mounted on said rotatable shaft for rotation therewith, said magnetically actuated switch means operable for coupling said impedance means across at least a first part of said transducer; and
switch actuating means including at least one magnet mounted on said stationary member for operating said magnetically actuated switch means, said actuating means being free of physical contact with said switch means.

2. The invention as defined in claim 1 wherein said transducer is a strain gage bridge and said impedance means is a resistor.

3. The invention as defined in claim 1 wherein said magnetically actuated switch means includes a plurality of reed switches electrically connected in parallel.

4. The invention as defined in claim 1 wherein said switch means further includes rings of magnetically permeable material surrounding said rotatable shaft for concentrating the lines of magnetic flux from said magnet to actuate said switch means.

5. The invention as defined in claim 1 wherein said impedance means includes a resistor and said magnetically actuated switch means includes a pair of switches each operable to couple said resistor across first and second parts of said transducer, respectively, and said magnetically actuated switch means includes means for selectively operating one of said switches.

6. The invention as defined in claim 1 wherein said impedance means includes a resistor, said magnetically actuated switch means includes two sets of magnetically actuatable switches, each set of magnetically actuatable switches including three switches electrically connected in parallel, each set of switches operable to couple said resistor across first or second parts of said transducer, respectively, and said switch actuating means includes a pair of selectively operable magnets for actuating one of said sets of switches.

7. The invention as defined in claim 1 wherein said magnetically actuated switch means further includes a pair of rings of a magnetically permeable material covered with a phenolic resin coating, said coating for electrically isolating said switch from said ring, said ring for concentrating a magnetic field to actuate the magnetically actuatable switch.

* * * * *